US007286491B1

(12) United States Patent
Smith (10) Patent No.: US 7,286,491 B1
(45) Date of Patent: *Oct. 23, 2007

(54) VIRTUAL LOCAL AREA NETWORK MEMBERSHIP REGISTRATION PROTOCOL FOR MULTIPLE SPANNING TREE NETWORK ENVIRONMENTS

(75) Inventor: Michael R. Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1043 days.

This patent is subject to a terminal disclaimer.

(21) Appl. No.: 10/288,865

(22) Filed: Nov. 6, 2002

Related U.S. Application Data (63) Continuation of application No. 09/259,428, filed on Mar. 3, 1999, now Pat. No. 6,515,969.

(51) Int. Cl.
    *H04L 12/46* (2006.01)
(52) U.S. Cl. .................. 370/256; 370/401; 370/408
(58) Field of Classification Search ................ 370/401, 370/402, 403, 408, 409, 254, 255, 256
    See application file for complete search history.

(56) References Cited

U.S. PATENT DOCUMENTS

| | | | |
|---|---|---|---|
| 4,922,486 A | | 5/1990 | Lidinsky et al. |
| 5,150,360 A | | 9/1992 | Perlman et al. |
| 5,394,402 A | * | 2/1995 | Ross ........................ 370/402 |
| 5,574,860 A | | 11/1996 | Perlman et al. |
| 5,740,171 A | | 4/1998 | Mazzola et al. |
| 5,742,604 A | | 4/1998 | Edsall et al. |
| 5,751,967 A | | 5/1998 | Raab et al. |
| 5,764,636 A | | 6/1998 | Edsall |
| 5,959,989 A | * | 9/1999 | Gleeson et al. ............. 370/390 |
| 5,978,378 A | | 11/1999 | Van Seters et al. |
| 6,188,694 B1 | * | 2/2001 | Fine et al. .................. 370/402 |

(Continued)

OTHER PUBLICATIONS

Lucent Technologies Inc.'s Intial Disclosure of Prior Art Under Civil Local Rule 16-7, U.S. District Court for the Northern District of California, C.A. No. C98-20836JW (PVT) ENE, Nov. 18, 1998.
Horowitz, S., Dual Layer Spanning Tree, A Spanning Tree Proposal for IEEE 802.10, May 14, 1997.
Delaney, D. and Seaman, M., Single or Multiple Filtering Databases, May 8, 1997.

(Continued)

*Primary Examiner*—Min Jung
(74) *Attorney, Agent, or Firm*—Cesari and McKenna LLP (57) ABSTRACT

The invention relates to a method and apparatus for disseminating Virtual Local Area Network (VLAN) membership information across computer networks defining multiple spanning trees. An intermediate network device configured in accordance with the invention includes a plurality of ports and a plurality of spanning tree engines each associated with one or more VLAN designations defined within the network. The spanning tree engines transition the ports among a plurality of port states, including a forwarding state and a blocked state. For each port, a separate Generic Attribute Registration Protocol (GARP) participant is also established and each GARP participant includes a multiple spanning tree (MST) GARP VLAN Registration Protocol (MST-GVRP) application component and an associated GARP Information Declaration (GID) component. The MST-GVRP application components cooperate to define a plurality of GARP Information Propagation (GIP) contexts each of which is associated with a spanning tree engine and thus its one or more VLAN designations. The MST-GVRP applications participate in zero, one or more of the GIP contexts depending on their spanning tree port states for the corresponding VLAN designations.

29 Claims, 5 Drawing Sheets

U.S. PATENT DOCUMENTS

| | | | |
|---|---|---|---|
| 6,304,575 B1 * | 10/2001 | Carroll et al. | 370/408 |
| 6,370,142 B1 | 4/2002 | Pitcher et al. | |
| 6,388,995 B1 | 5/2002 | Gai et al. | |
| 6,515,969 B1 * | 2/2003 | Smith | 370/256 |
| 6,711,171 B1 * | 3/2004 | Dobbins et al. | 370/400 |
| 6,813,250 B1 * | 11/2004 | Fine et al. | 370/256 |

OTHER PUBLICATIONS

Horowitz, S., Dancing Bears, IEEE 802.1 Virtual LANs, Mar. 6, 1996.

Perlman, R., Interconnections: Bridges and Routers, (coo) 1992, pp. 54-64, Addison-Wesley Publishing Company, Inc.

IEEE Draft Standard for Virtual Bridged Local Area Networks, Jul. 4, 1996, pp. 1, 6-7 and 28-31.

IEEE Draft Standard for Virtual Bridged Local Area Networks, Aug. 30, 1996, pp. 1-7 and 35-39.

IEEE Draft Standard for Virtual Bridged Local Area Networks, May 16, 1997, pp. 1-10 and 20-21.

Finn, N. and Smith, M., Multiple 802.1Q Spanning Trees, Presentation at IEEE LMSC Meeting, Jul. 1998.

Configuring VTP and Virtual LANs, Cisco Systems, Inc., Dec. 30, 1998.

IEEE P802.1Q Draft Standards for Local and Metropolitan Area Networks: Virtual Bridged Local Area Networks, Mar. 1998, pp. 1-16, 91-96 and 195-204.

Information Technology-Telecommunications and Information Exchange Between Systems-Local and Metropolitan Area Networks-Common Specifications-Part 3: Media Access Control (MAC) Bridges: Revision, IEEE P802.1D/D15, Nov. 24, 1997, pp. 1-17, 22, 48-49, 63-65, 135-143 and 156-188.

* cited by examiner

VIRTUAL LOCAL AREA NETWORK MEMBERSHIP REGISTRATION PROTOCOL FOR MULTIPLE SPANNING TREE NETWORK ENVIRONMENTS

CROSS-REFERENCE TO RELATED APPLICATIONS

This application is a continuation of application Ser. No. 09/259,428, now issued as U.S. Pat. No. 6,515,969, filed Mar. 3, 1999.

This application is related to the following U.S. patent application:

U.S. patent application Ser. No. 08/997,297, now issued as U.S. Pat. No. 6,188,694, entitled SHARED SPANNING TREE PROTOCOL, filed Dec. 23, 1997.

FIELD OF THE INVENTION

The present invention relates generally to computer networks, and more specifically, to a method and apparatus for disseminating virtual local area network membership information across computer networks running multiple spanning trees.

BACKGROUND OF THE INVENTION

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs are interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that are coupled to the LANs or end stations. Ports used to couple switches to each other are generally referred to as a trunk ports, whereas ports used to couple switches to LANs or end stations are generally referred to as access ports. The switching function includes receiving data from a sending entity at a source port and transferring that data to at least one destination port for forwarding to a receiving entity.

Switches and bridges typically learn which destination port to use in order to reach a particular entity by noting on which source port the last message originating from that entity was received. This information is then stored in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

Spanning Tree Algorithm

To avoid the formation of loops, many intermediate network devices execute a spanning tree algorithm that allows them to calculate an active network topology which is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the spanning tree protocol, bridges elect a single bridge to be the "root" bridge. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root.

The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames are not forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. Conventional BPDU messages contain a number of fields, including a root identifier field, a root path cost field, a bridge identifier field and a port identifier field, among others. Each bridge initially assumes itself to the be the root and transmits BPDU messages accordingly. Upon receipt of a BPDU message, its contents are examined and compared with similar information (e.g., assumed root and lowest root path cost) stored by the receiving bridge. If the information from the received BPDU is "better" than the stored information, the bridge adopts the better information and uses it in the BPDUs that it sends from its ports, other than the port on which the "better" information was received. Although BPDU messages are not forwarded by bridges, the identifier of the root is eventually propagated to and adopted by all bridges as described above, allowing them to select their root ports and any designated port(s).

In response to network changes or failures, BPDU information is up-dated and/or times-out, causing the active topology to be re-calculated. As a result, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, ports typically transition through two intermediate states: a listening state and a learning state. In the listening state, a port waits for information indicating that it should return to the blocking state. If, by the end of a preset time, no such information is received, the port transitions to the learning state. At the end of a second preset time, the port transitions from the learning state to the forwarding state, thereby allowing data frames to be forwarded to and from the port.

Virtual Local Area Networks

A computer network may also be segregated into a series of logical network segments. For example, U.S. Pat. No. 5,394,402, issued on Feb. 28, 1995 to Ross (the "'402 patent"), which is hereby incorporated by referenced in its entirety, discloses an arrangement for associating any port of a switch with any particular segregated network group. Specifically, according to the '402 patent, any number of physical ports of a particular switch may be associated with any number of groups within the switch by using a virtual local area network (VLAN) arrangement that virtually associates the port with a particular VLAN designation. More specifically, Ross discloses a switch or hub that associates VLAN designations with at least one local port and further associates those VLAN designations with messages transmitted from any of the ports to which the VLAN designation has been assigned.

The VLAN designation for each local port is stored in a memory portion of the switch such that every time a message is received by the switch on a local port the VLAN designation of that port is associated with the message. Association is accomplished by a flow processing element which looks up the VLAN designation in the memory portion based on the local port where the message originated. In addition to the '402 patent, the IEEE has issued a standard for Virtual Bridged Local Area Networks. See IEEE Standard 802.1Q.

In many cases, it may be desirable to interconnect a plurality of these switches in order to extend the VLAN associations of ports in the network. Ross, in fact, states that an objective of his VLAN arrangement is to allow all ports and entities of the network having the same VLAN designation to interchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment. For convenience, each VLAN designation is often associated with a different color, such as red, blue, green, etc.

GARP VLAN Registration Protocol

To disseminate information across computer networks, the IEEE developed the Generic Attribute Registration Protocol (GARP). GARP allows participants to make and withdraw declarations for a particular attribute. In response to a GARP declaration, other network participants register the parameter value(s) of the specified attribute at the port on which the declaration was received. GARP participants also propagate declarations so that other participants in the network can make the appropriate registrations. Participants can also withdraw their previous declarations. In response to a withdrawal, the other participants de-register the particular parameter value(s).

Figure 1:
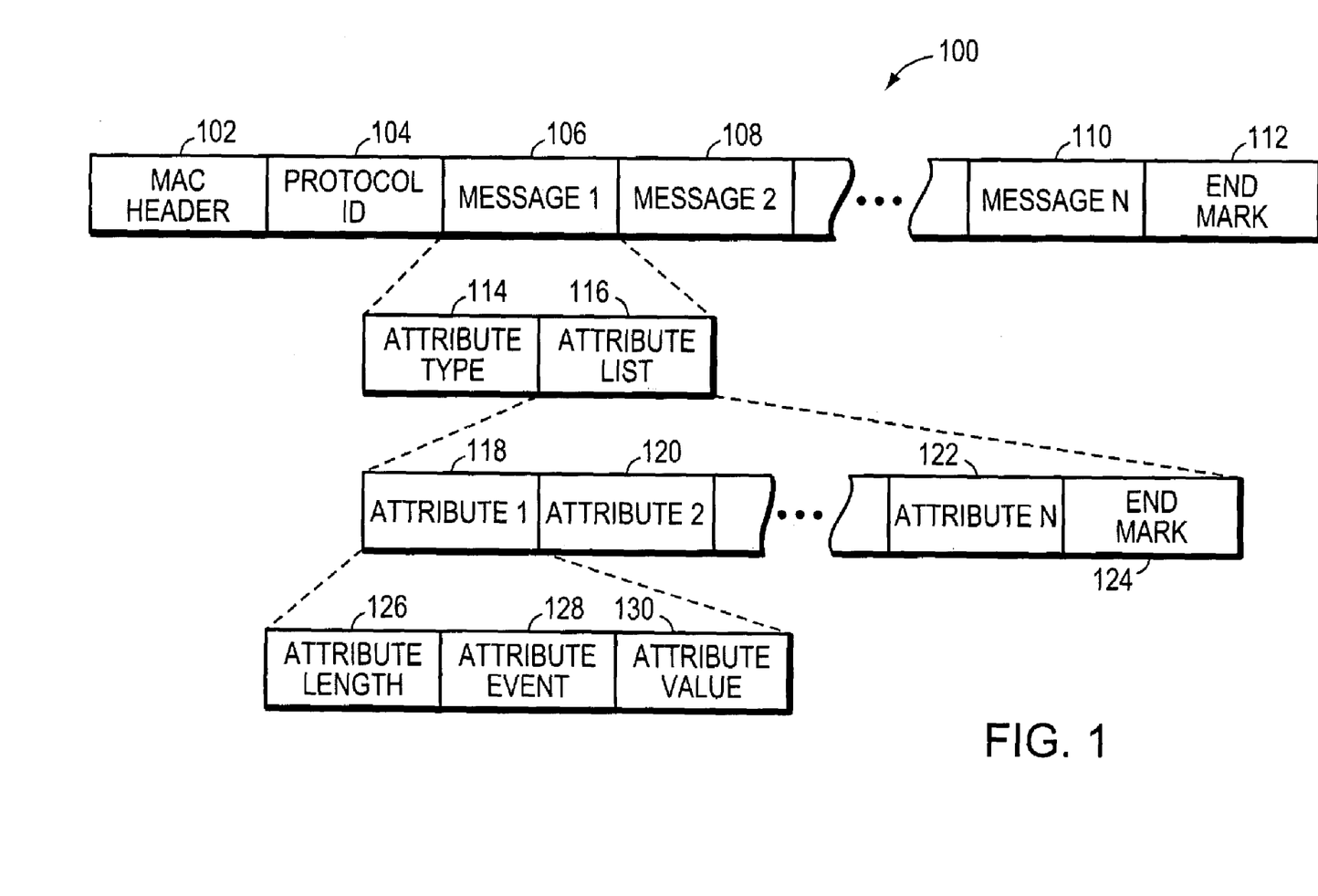
FIG. 1, previously discussed, is a block diagram of a conventional Generic Attribute Registration Protocol protocol data unit (GARP-PDU) message.

A GARP participant consists of a GARP application component and a GARP Information Declaration (GID) component. The GID component consists of a set of state machines that define the current registration and declaration state for all attribute values. A GARP participant is typically established for each port per GARP application. Thus, for intermediate devices, which often have multiple ports, multiple GARP participants are established. To make or withdraw declarations, GARP participants generate and send special messages called GARP Protocol Data Unit (GARP-PDU) messages. FIG. 1 is a block diagram of a conventional GARP-PDU message 100. The GARP-PDU message 100 typically includes a Media Access Control (MAC) header 102 that includes destination and source address fields, among other information, a protocol identifier (ID) field 104, a plurality of message fields, such as message fields 106, 108 and 110, and an end mark field 112. Each message field, moreover, includes an attribute type field 114 and an attribute list field 116. The attribute list field 116, in turn, includes one or more attribute fields, such as attribute fields 118, 120 and 122, and an end mark field 124. Each attribute field, such as field 118, includes an attribute length field 126, an attribute event field 128 and an attribute value field 130.

In order to exchange information among the GARP participants of a given intermediate device, a separate component, called the GARP Information Propagation (GIP) component, is used. The GIP component operates over a GIP context that is established at the intermediate device and defines the ports that are to be included in the given context. That is, although registration can occur at any port, the propagation of that registration only follows the associated GIP context. For example, a particular GIP context may consist of the ports that belong to the active topology (i.e., all ports in the forwarding state). Because blocked ports are not part of the GIP context, a declaration received on a blocked port is not propagated to any other ports, although it is still registered at the blocked port. In contrast, a declaration received at a forwarding port, which is part of the GIP context, is both registered at that port and propagated throughout the GIP context (i.e., to all of the other forwarding ports).

One application of GARP is to propagate VLAN designations across computer networks. More specifically, the IEEE also defined the GARP VLAN Registration Protocol (GVRP) through which intermediate devices and end stations can issue and revoke declarations regarding their membership in specific VLANs. See IEEE 802.1Q standard. Thus, GVRP provides a mechanism for end stations to ensure that they receive messages from other VLAN members, regardless of where in the network those other members may be located. For example, an end station that is assigned to the "blue" VLAN typically generates and sends a GARP-PDU message 100 containing the VLAN identifier (VID) for the "blue" VLAN designation in the attribute value field 130 and a registration request in the corresponding attribute event field 128. The GARP-PDU message 100 is then received at an intermediate device coupled to the end station. The intermediate device registers the "blue" VLAN at the port on which the GARP-PDU is received and, assuming the receiving port is in the forwarding state, also propagates the information for registration and forwarding from its other forwarding ports. The GARP-PDU from the end station is thus propagated across the network along the active topology defined by the spanning tree protocol. If the GARP-PDU is received by an intermediate device at a blocked port, the VLAN designation is merely registered at that blocked port. The VLAN designation is neither registered at the device's other ports nor is it propagated by the device.

For computer networks defining a single spanning tree or active topology, the GVRP protocol provides an effective mechanism for disseminating VLAN membership information. Indeed, in the 802.1Q standard, the IEEE specifically calls for a single spanning tree or active topology to be defined for the entire bridged network including all VLAN designations. As an alternative to the 802.1Q standard, certain intermediate devices define a separate spanning tree for each VLAN designation. See Cisco Internetwork Operating System (IOS®) VLAN Services document. With this approach, a single port may be forwarding for one VLAN (e.g., "blue"), but blocking for a second VLAN (e.g., "red"). Thus, messages associated with the "blue" VLAN designation are received and forwarded from the port, whereas messages associated with the "red" VLAN designation are not. For interoperability with network segments defining a single spanning tree devices, these devices may also define a base or common spanning tree that is mapped to the single spanning tree in the network segments that operate single spanning trees. With multiple spanning trees, however, the conventional GVRP implementation cannot guarantee that VLAN membership information will be fully distributed throughout the network. That is, connectivity problems can occur.

In particular, with the conventional GVRP implementation, a single GIP context corresponding to the base spanning tree would be established. If a GVRP declaration requesting registration of the "blue" VLAN designation is received at a first intermediate device port that is in the forwarding state for "blue" VLAN, but in the blocking state for the base spanning tree, the registration would not be propagated from the first port. That is, because the first port is in the blocking state for the base spanning tree, it is not part of the GIP context. If the first port nonetheless represents the only path to certain members of the "blue" VLAN, none of the other blue VLAN members will learn of their existence. As a result, connectivity may be lost to the blue VLAN members "behind" the first port. Accordingly, a need exists for ensuring that VLAN membership information is disseminated across and registered by computer networks running multiple spanning trees.

SUMMARY OF THE INVENTION

It is an object of the present invention to provide a method and apparatus for disseminating Virtual Local Area Network (VLAN) membership information across computer networks running multiple spanning trees.

It is a further object of the present invention to provide a method and apparatus for disseminating VLAN membership information across computer networks running multiple spanning trees that is also interoperable with network segments running one spanning tree or a plurality of shared spanning trees.

Briefly, the invention relates to a method and apparatus for disseminating Virtual Local Area Network (VLAN) membership information across computer networks running multiple spanning trees. In particular, an intermediate device includes a plurality of ports for interconnecting entities of a computer network. The device further includes a separate spanning tree engine for each instance of the spanning tree protocol running at the device. The spanning tree engines transition the ports of the device among a plurality of spanning tree states, including a forwarding state and a blocking state, per instance of the spanning tree protocol. For each port, a separate Generic Attribute Registration Protocol (GARP) participant is also established. Each GARP participant includes a multiple spanning tree (MST) GARP VLAN Registration Protocol (MST-GVRP) application component and an associated GARP Information Declaration (GID) component. The MST-GVRP application components cooperate to define a plurality of GARP Information Propagation (GIP) contexts each of which is associated with one of the instances of the spanning tree protocol. The multiple GIP contexts are then used to exchange VLAN membership information between the MST-GVRP application components and to disseminate that information across the network, thereby ensuring connectivity among all VLANs.

More specifically, for a given port, the MST-GVRP application component preferably queries the spanning tree engines to determine for which instances of the spanning tree protocol, if any, the given port is in the forwarding state. The MST-GVRP application component then joins as a participant in each of the GIP contexts for those instances of the spanning tree protocol for which its port is in the forwarding state. The MST-GVRP application component does not participate in those GIP contexts corresponding to the instances of the spanning tree protocol for which its port is in the blocking state. When a declaration requesting membership in a first VLAN is received at the MST-GVRP application component, it registers the declared VLAN designation at its port. Furthermore, if the port is in the forwarding state for the instance of the spanning tree protocol that corresponds to the declared VLAN designation (and thus participates in the corresponding GIP context), the MST-GVRP application component also distributes the declaration to the other ports participating in that GIP context. If the port is in the blocking state for the instance of the spanning tree protocol corresponding to the declared VLAN, the MST-GVRP application component merely registers the declared VLAN. It does not disseminate the declaration to any other ports.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENT

Figure 2:
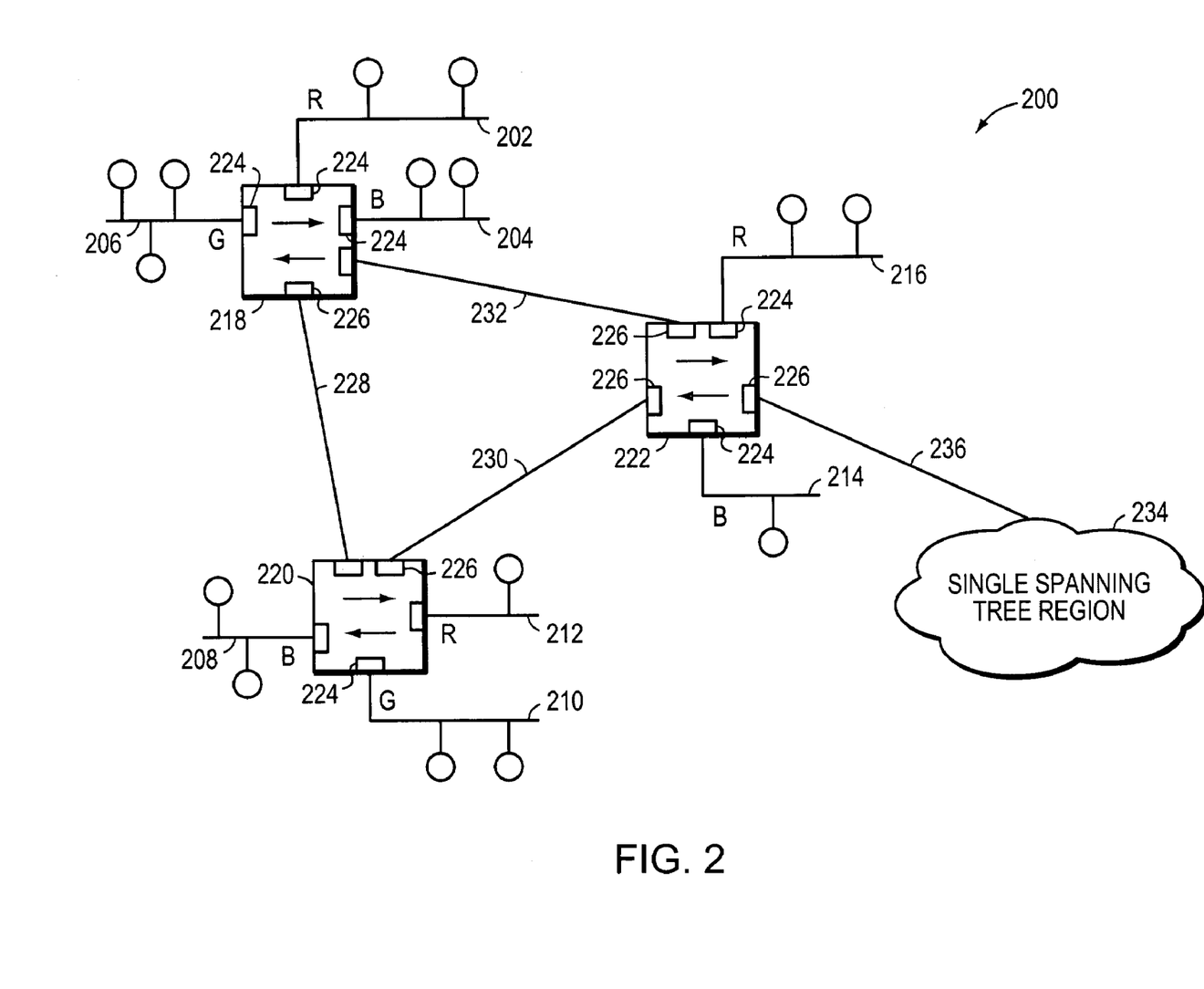
FIG. 2 is a highly schematic block diagram of a computer network in accordance with the present invention.

FIG. 2 is a block diagram of a computer network 200 comprising a plurality of local area networks (LANs) 202-216 that are interconnected by a plurality of intermediate devices 218-222. More specifically, each intermediate device 218-222 has a plurality of ports, such as access ports 224 and trunk ports 226, and each LAN 202-216 is preferably coupled to at least one access port 224 of the intermediate devices 218-222. The intermediate devices 218-222, in turn, are interconnected by one or more trunks 228-232, which may be point-to-point links. Each trunks 228-232 is coupled to a corresponding trunk port 226 at the intermediate devices 218-222.

As shown, network 200 includes a plurality of redundant communication paths. The existence of such redundant paths prevents portions of the network 200 from becoming isolated should any constituent link or intermediate device fail. Such redundancy, however, also results in the creation of loops, which, as described above, are highly undesirable. To avoid the creation of loops, devices 218-222 preferably execute a spanning tree protocol. In particular, devices 218-222, as described below, define multiple active topologies or spanning trees such that each spanning tree or active topology corresponds to a specific VLAN designation.

In addition, intermediate devices 218-222 are preferably configured to recognize one or more Virtual Local Area Network (VLAN) designations. Accordingly, subsets of LANs 202-216 may be logically grouped together to form VLANs. For convenience, each VLAN designation may be identified by a color code, e.g., "R" for red, "B" for blue and "G" for green. Each VLAN designation may also have a corresponding numeric identifier. For example, the IEEE 802.1Q standard allocates the numeric identifiers 1-4095 as possible VLAN designations, thereby supporting up to 4095 different VLAN designations within a bridged network.

Similarly, trunk ports 226 are preferably configured to operate in accordance with any number of VLAN encapsulation protocols, such as the IEEE 802.1Q Virtual Bridged Local Area Networks Protocol standard, which is hereby incorporated by reference in its entirety or the Interswitch Link (ISL) mechanism from Cisco Systems, Inc., as described in U.S. Pat. No. 5,742,604, which is also hereby incorporated by reference in its entirety. Those skilled in the art will understand that other VLAN encapsulation or tagging protocols may be used.

Network 200 may also include one or more single spanning tree (SST) regions, such as SST region 234. The SST region 234 may include a plurality of network entities, such as end stations, servers and intermediate devices (not shown). Although the intermediate devices of the SST region 234 are preferably VLAN-compatible, they are configured in a conventional manner to establish a single spanning tree or active topology. SST Region 234 is coupled to intermediate device 222 by trunk 236.

It should be understood that network 200 is meant for illustrative purposes only and that the present invention will operate with other, possibly far more complex, network designs having multiple network components, such as end stations, servers, LANs, bridges, switches, routers, gateways, etc.

Figure 3:
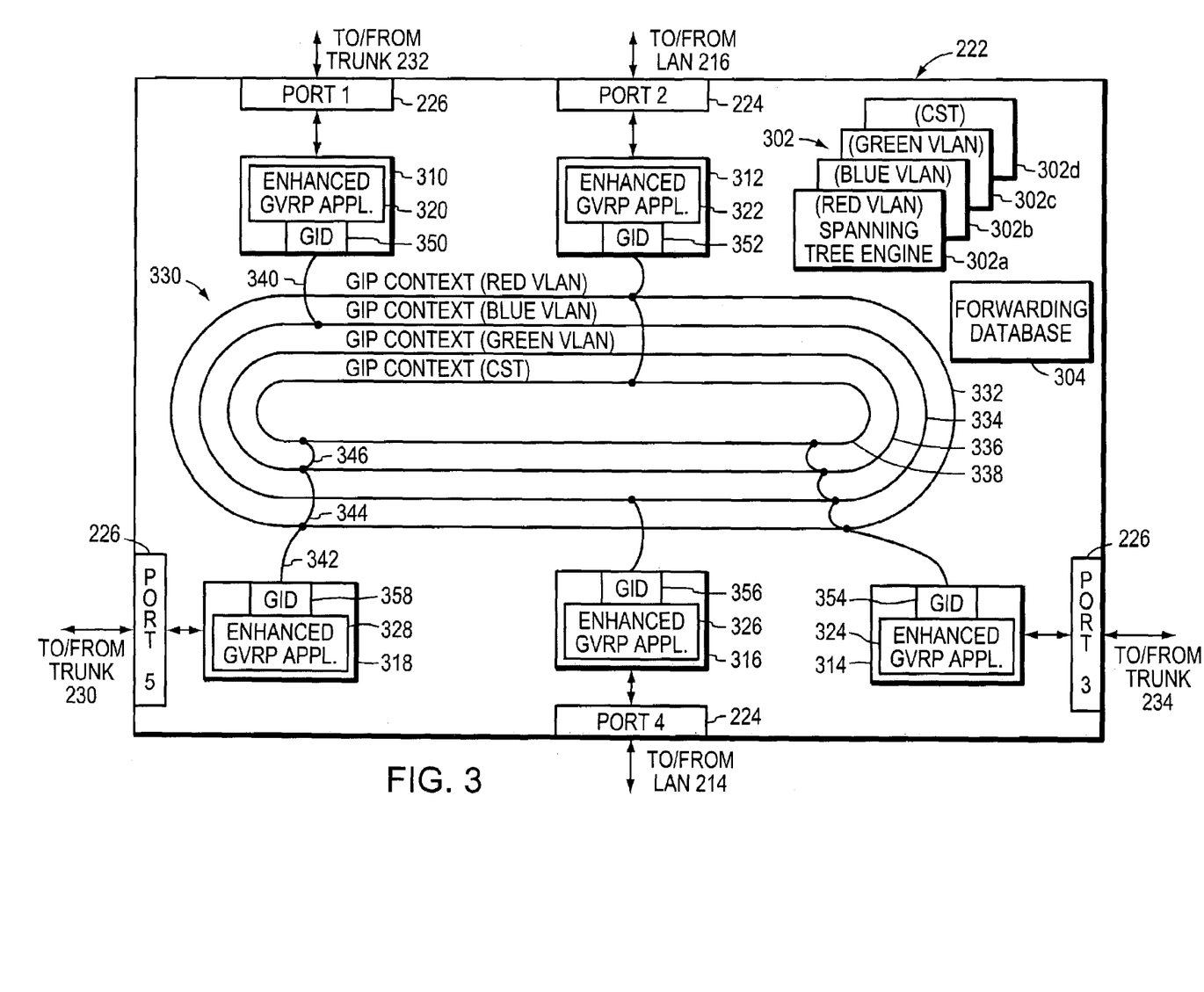
FIG. 3 is a highly schematic, partial block diagram of an intermediate network device in accordance with a preferred embodiment of the present invention.

FIG. 3 is a partial block diagram of intermediate device 222 in accordance with the present invention. As described above, intermediate device 222 includes a plurality of ports, which may be configured by a network administrator as access or trunk ports 224, 226. Each port 224, 226 may also be identified by a number (e.g., port numbers 1 through 5). Associated with ports 224, 226 are one or more frame transmission and reception objects (not shown), such as priority queues, so that network messages or data frames received at a given port may be captured and frames to be transmitted may be delivered to a given port. Device 222 further includes transmitting and receiving circuitry and components, including one or more network interface cards (NICs) for exchanging of data frames, one or more central processing units (CPUs) and associated memory devices for performing calculations, and one or more bus structures. A suitable platform for intermediate device 222 is the Catalyst 5000 series of switches from Cisco Systems, Inc.

As mentioned above, intermediate device 222 is configured to define a plurality of active topologies within network 200. More specifically, intermediate device 222 includes a plurality of spanning tree engines 302, such as spanning tree engines 302a-d, each of which is configured to run a separate instance of the spanning tree protocol. In the preferred embodiment, each spanning tree engine 302a-d is associated with a different VLAN designation (e.g., red, blue and green) presently established within network 200. That is, there is a spanning tree engine (e.g., engine 302a) associated with the red VLAN designation, a spanning tree engine (e.g., engine 302b) associated with the blue VLAN designation and so on. The spanning tree engines 302a-d are in communicating relationship with ports 224, 226 and are configured to generate BPDU messages for transmission from the ports and to process received BPDU messages. In particular, each spanning tree engine 302 may append a VLAN tag to the BPDU messages it generates so that the BPDU message may be correlated to a given VLAN. For example, spanning tree engine 302a, which is associated with the red VLAN, appends a red VLAN tag to its BPDU messages. Similarly, each spanning tree engine 302 only processes those BPDU messages to which its VLAN designation has been appended. For example, a BPDU message having a red VLAN tag received at any port 224, 226 of device 222 is captured and processed by spanning tree engine 302a, which is associated with the red VLAN. Alternatively, the association between BPDU messages and VLAN designations may be implicit (i.e., no tagging of BPDU messages). For example, an un-tagged BPDU message that is received on a port that is associated with a particular VLAN designation may also be associated with that VLAN designation.

It should be understood that a network administrator may manually configure device 222 with the VLAN designations of network 200 using Command Line Interface (CLI), Simple Network Management Protocol (SNMP) or any other suitable configuration processes. It should be further understood that VLAN designations may be propagated across the network 200 and received at device 222 through a VLAN configuration protocol, such as the VLAN Trunk Protocol (VTP) from Cisco Systems, Inc. See Understanding VLAN Trunk Protocol.

Each spanning tree engine 302 independently transitions the ports 224, 226 of device 222 among a plurality of states, including blocking, listening, learning and forwarding, by comparing the contents of received BPDU messages with the contents of BPDU messages sent from the port. Thus, the state of a single port (e.g., port number 1, which corresponds to trunk port 226 coupled to trunk 232) may differ depending on the VLAN designation. For example, spanning tree engine 302a may transition port number 1 to the forwarding state for the red VLAN, while spanning tree engine 302b may transition port number 1 to the blocking state for the blue VLAN. In the preferred embodiment, device 222 also includes a common spanning tree (CST) engine 302d for receiving and processing any untagged BPDU messages.

Device 222 further includes at least one filtering database 304. The filtering database 304 is configured to store the destination address and corresponding port number (e.g., port numbers 1-5) used to reach specific end stations and other network devices. The filtering database 304 is also configured to store the VLAN designation(s) associated with each port 224, 226, as described below. Device 222 utilizes its filtering database 304 in a conventional manner for making forwarding decisions regarding network messages received on its ports 224, 226. It should be understood that device 222 may have a plurality of filtering databases 304 each associated with a different VLAN designation. Alternatively, device 222 may include two or more filtering databases 304 that are shared among the various VLAN designations.

Also associated with each port 224, 226 of device 222 is a Generic Attribute Registration Protocol (GARP) participant 310-318. The GARP participants 310-318 are in communicating relationship with the spanning tree engines 302 and the filtering database 304. Each GARP participant 310-318, moreover, includes a multiple spanning tree (MST) GARP VLAN Registration Protocol (MST-GVRP) application component 320-328 and a GARP Information Declaration (GID) component 350-358. Each GID component 350-358, moreover, defines and operates upon a set of well-known state machines (not shown), as described in the IEEE 802.1D Local and Metropolitan Area Networks standard, which is hereby incorporated by reference in its entirety.

The MST-GVRP applications 320-328 preferably communicate and exchange information with each other through one or more GARP Information Propagation (GIP) components 330 that manifest as a plurality of GIP contexts 332-338. In particular, the MST-GVRP applications 320-328 cooperate to establish a separate GIP context for each instance of the spanning tree protocol running at device 222. In the preferred embodiment, where there is one instance of the spanning tree protocol per VLAN designation, each GIP context (e.g., GIP context 332) may likewise be associated with the VLAN designation (e.g., red) to which its instance of the spanning tree protocol corresponds. Each MST-GVRP application 320-328, moreover, may participate in zero, one or more of the GIP contexts 332-328, depending on the spanning tree states of its associated port, as described herein.

Those skilled in the art will understand that filtering database 304 may be implemented as a content addressable memory (CAM) device. Furthermore, the spanning tree engines 302 and MST-GVRP applications 320-328 may comprise registers and combinational logic configured and arranged to produce sequential logic circuits. In the preferred embodiment, spanning tree engines 302 and MST-GVRP applications 320-328 preferably comprise computer software modules or libraries pertaining to the methods described herein and executable by one or more programmable processing elements. Other computer readable media may also be used to store the program instructions for execution.

Figure 4A:
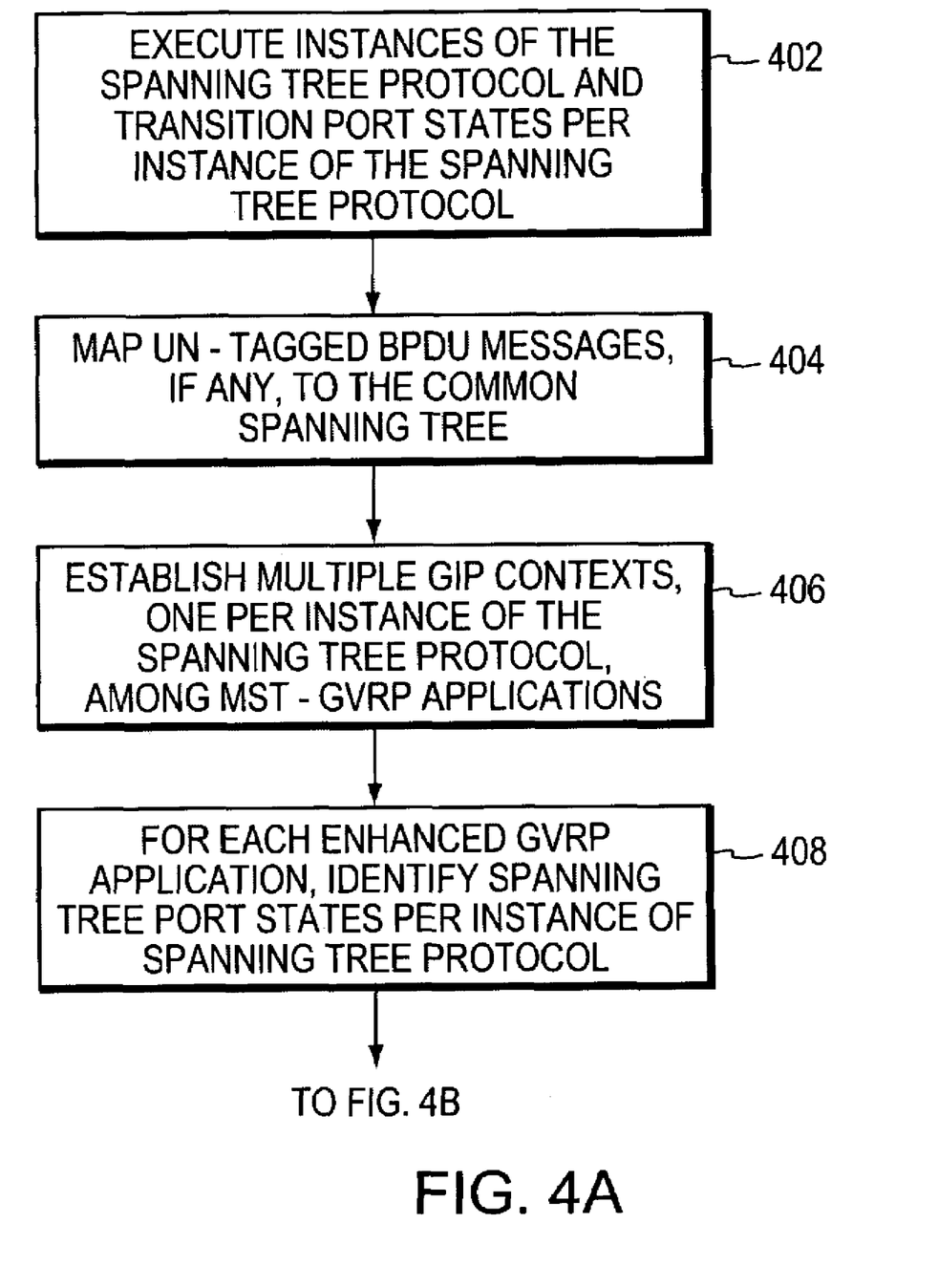
FIGS. 4A-4B are flow diagrams of the preferred method of the present invention.
Figure 4B:
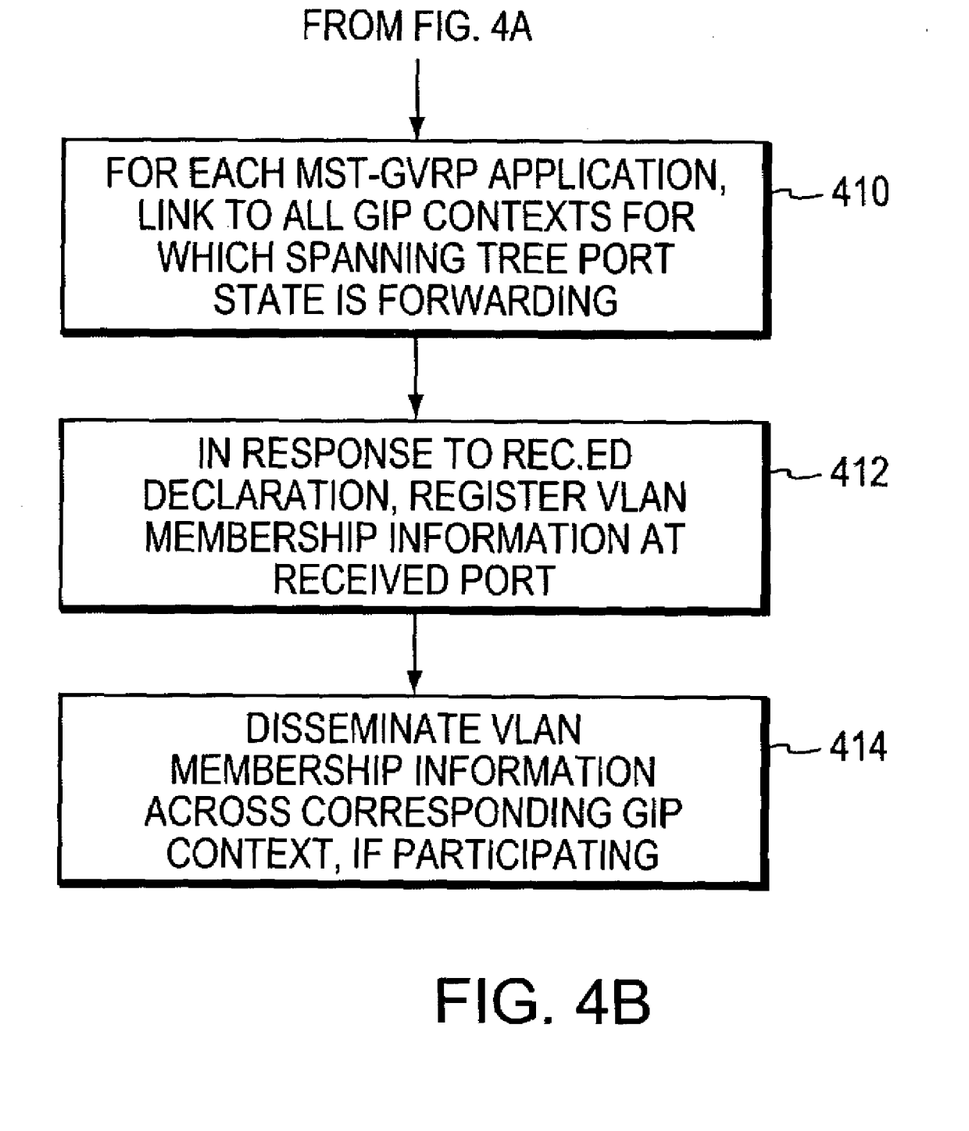

FIGS. 4A and 4B are flow diagrams of the preferred methods of the present invention. As indicated at block 402, in operation, the spanning tree engines 302 generate, transmit and process BPDU messages so as to define an active topology for multiple instances of the spanning tree protocol. In the preferred embodiment, spanning tree engines 302a-302c each generate, transmit and process BPDU messages that have been tagged (or are otherwise associated) with the VLAN designation of the corresponding spanning tree engine. Upon convergence of an active topology for each VLAN designation, the state of each port 224, 226 at device 222 is either blocking or forwarding, unless the port was disabled by management action. To the extent device 222 receives untagged BPDU messages from intermediate devices in the single spanning tree region 234, they are processed by the CST spanning tree engine 302d. CST spanning tree engine 302d preferably maps the single spanning tree from SST region 234 to a single active topology defined in the multiple spanning tree network segment, as indicated at block 404. For example, CST spanning tree engine 302d may designate the VLAN designation with the lowest numeric identifier (e.g., red) as the common spanning tree for purposes of mapping the single spanning tree from SST region 234 to the rest of the network 200. Additionally, CST spanning tree engine 302d may generate untagged BPDU messages for transmission from port number 3 to the SST region 234 for processing by the intermediate devices located therein.

Furthermore, the MST-GVRP applications 320-328 cooperate to establish a separate GIP context for each instance of the spanning tree protocol, as indicated at block 406. In particular, the MST-GVRP applications 320-328 query the spanning tree engines 302 to determine how many instances of the spanning tree protocol are defined. In response, the MST-GVRP applications 320-328 proceed to establish separate GIP contexts 332-336 for each identified instance of the spanning tree protocol. The MST-GVRP applications 320-328 may also establish a GIP context 330 for the common spanning tree (CST). In the preferred embodiment, the multiple GIP contexts 330 are established simultaneously with the execution of the instances of the spanning tree protocol.

It should be understood that the GVRP applications 320-328 may alternatively learn of the various VLAN designations and thus the instances of the spanning tree protocol directly through CLI, SNMP or VTP.

The MST-GVRP applications 320-328 next determine among which GIP contexts 332-338, if any, they should participate. Each MST-GVRP application 320-328 may participate in zero, one or more of the GIP contexts 330, depending on the state of its respective port for each identified instance of the spanning tree protocol. To determine its various port states, the MST-GVRP applications 320-328 again query the spanning tree engines 302, as indicated at block 408. Each MST-GVRP application 320-328 then participates only in those GIP contexts matching the instance of the spanning tree protocol for which its port is in the forwarding state, as indicated at block 410.

For example, assume that port number 1 is in the forwarding state for the blue VLAN, but is blocking for the green and red VLANs. In response, MST-GVRP application 320, which is associated with port number 1, participates in GIP context 334 which is associated with the blue VLAN designation, as indicated by arc 340 (FIG. 3). MST-GVRP application 320 does not, however, participate in GIP contexts 332 or 336 which are associated with the red and green VLAN designations, respectively. Similarly, assume that port number 5 is forwarding for the red and green VLANs, but blocking for the blue VLAN. In this case, MST-GVRP application 328 participates in GIP contexts 332 and 336, which are associated with the red and green VLAN designations, respectively, as indicated by arcs 342 and 344. Additionally, since CST spanning tree engine 302d has mapped the common spanning tree to the red VLAN designation, and MST-GVRP application 328 participates in GIP context 332, it also participates in GIP context 338 (which is associated with the CST spanning tree), as indicated by arc 346.

It should be understood that a separate GIP context need not be established for the Common Spanning Tree (CST) if it is associated with another GIP context (e.g., red).

The MST-GVRP applications associated with remaining ports (i.e., port numbers 2-4) similarly proceed to determine among which GIP contexts 332-338, if any, they should participate. It should be understood that if a port is disabled or it is in the blocking state for all VLAN designations, it preferably does not participate in any GIP contexts.

With the MST-GVRP applications 320-328 participating in the appropriate GIP contexts, execution of the GVRP protocol proceeds in a conventional manner. That is, VLAN designations declared in GARP-PDU messages 100 received at a port are registered at the port by the respective MST-GVRP application, as indicated at block 412. More specifically, the registration is recorded at the filtering database 304. Furthermore, if the MST-GVRP application is participating in the GIP context for the declared VLAN, then it also disseminates the declaration across the corresponding GIP context, as indicated at block 414.

For example, if a GARP-PDU declaration message 100 (FIG. 1) is received at port number 1 seeking to register membership in the green VLAN, it is captured and processed by that port's MST-GVRP application 320. That is, MST-GVRP application 320 registers the green VLAN designation at port number 1 (i.e., records it at filtering database 304). MST-GVRP application 320 also determines whether the declaration should be distributed to any of the other MST-GVRP applications 322-328, based on its participation in the various GIP contexts 332-338. In particular, MST-GVRP application 320 determines whether it is participating in the particular GIP context that corresponds to the VLAN designation of the declaration. Here, the declared VLAN designation is green, but MST-GVRP application 320 is not participating in the "green" GIP context 336. Accordingly, the declaration is not distributed by MST-GVRP application 320.

If a GARP-PDU declaration message 100 seeking to register membership in the blue VLAN designation is received at port number 1, it is captured by MST-GVRP application 320. Again, regardless of the spanning tree state of port number 1, MST-GVRP application 320 registers the blue VLAN designation at port number 1. Since MST-GVRP application 320 is participating in GIP context 334 which corresponds to the blue VLAN designation, it distributes the declaration across GIP context 334. Accordingly, the declaration is received at MST-GVRP applications 324 and 326, which are associated with port numbers 3 and 5, respectively, and are also participating in GIP context 334. In response, each of these MST-GVRP applications 324, 326 register the blue VLAN designation at their ports. MST-GVRP applications 324, 326 also generate GARP-PDU declaration messages 100 that request membership in the blue VLAN for transmission from their respective ports.

If a GARP-PDU message 100 is received containing multiple VLAN designations, the corresponding MST-GVRP application treats each VLAN designation separately. That is, the MST-GVRP application registers each VLAN designation at its port, but only distributes those declared VLAN designations for which its port is forwarding (i.e., only along those GIP contexts among which it participates).

In the preferred embodiment, if a GARP-PDU message 100 is received seeking to register a VLAN designation that is unknown to device 222, the request is preferably ignored. It should be understood, however, that, in response to a request to register an unknown VLAN designation, the MST-GVRP applications 320-328 may cooperate to establish a new GIP context 330 for the previously unknown VLAN designation. Furthermore, if an existing VLAN designation is deleted through CLI, SNMP or VTP action, the MST-GVRP applications 320-328 preferably destroy the corresponding GIP context.

GARP-PDU declaration messages 100 received at port number 3 from the single spanning tree region 234 are similarly registered and distributed across the GIP context 338 corresponding to the Common Spanning Tree (CST) and GARP-PDU messages requesting withdrawal of previous registration requests are generally handled in a conventional manner.

Spanning Tree Topology Changes

In response to changes or failures in network 200 (e.g., device or link failures, removals or additions), the spanning tree engines 302 re-calculate the active topology. As a result, one or more ports 224, 226 of device 222 may transition from blocking to forwarding or vice versa. Since spanning tree port state affects participation in the GIP contexts, the MST-GVRP applications 320-328 preferably monitor the decisions of the spanning tree engines 302 to detect any such changes. In particular, the MST-GVRP applications 320-328 preferably register with the spanning tree engines 302 so as to receive notifications regarding changes in the port states. If an MST-GVRP application detects that its respective port has been transitioned from forwarding to blocking for a given instance of the spanning tree protocol, it relinquishes its participation in the corresponding GIP context. Similarly, if an MST-GVRP application detects that its port has been transitioned from blocking to forwarding for a given instance of the spanning tree protocol, the MST-GVRP application joins the corresponding GIP context as a new participant.

For example, assume that port number 5 transitions from forwarding to blocking for the green VLAN. This change is detected by MST-GVRP application 328, which, in response, relinquishes its participation in GIP context 336, corresponding to the green VLAN. Thus, if a GVRP-PDU declaration message 100 is received at port number 5 seeking to register membership in the green VLAN, MST-GVRP application 328 registers the declaration at port number 5, but does not distribute the declaration to any of the other MST-GVRP applications as it no longer participates in the corresponding GIP context 336. Similarly, if port number 1 transitions from blocking to forwarding for the green VLAN, the change is detected by MST-GVRP application 320. In response, MST-GVRP application 320 joins in the corresponding GIP context (i.e., GIP context 336) as a new participant. Thereafter, if a GARP-PDU message 100 is received at port number 1 seeking to register membership in the green VLAN, MST-GVRP application 320 both registers the declaration and distributes it to the other MST-GVRP applications participating in GIP context 336.

Shared Spanning Trees

As described in co-pending U.S. patent application Ser. No. 08/997,297 entitled, SHARED SPANNING TREE PROTOCOL, which is hereby incorporated by reference in its entirety, an intermediate device may establish a plurality of shared spanning trees rather than a separate spanning tree for each VLAN designation. According to the Shared Spanning Tree Protocol, each shared spanning tree is defined by a primary VLAN and may include, in addition to the primary VLAN, any number of secondary VLANs. The MST-GVRP applications of the present invention may be further configured to operate in a shared spanning tree environment. In this embodiment, a separate GIP context 330 is established for each primary VLAN only. GIP contexts are not established for secondary VLANs. Furthermore, if a declaration is received seeking registration of a secondary VLAN, it is distributed by the MST-GVRP application only if the port is in the forwarding state for the primary VLAN to which the secondary VLAN belongs.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An intermediate network device having a plurality of ports for forwarding messages among one or more network entities of a computer network that is segregated into a plurality of virtual local area networks (VLANs), the intermediate network device comprising:
   a spanning tree engine configured to cooperate in the computation of multiple spanning tree instances within the computer network and, for each spanning tree instance, to transition the ports among a plurality of spanning tree states, including a forwarding state and a blocking state;
   a Generic Attribute Registration Protocol (GARP) participant at each port, each GARP participant having a Multiple Spanning Tree (MST) GARP VLAN Registration Protocol (MST-GVRP) application and a GARP Information Declaration (GID) component; and
   a plurality of GARP Information Propagation (GIP) contexts providing communication between the MST-GVRP applications, each GIP context being associated with a single spanning tree instance, wherein
   participation of the MST-GVRP applications in the GIP contexts depends on the spanning tree states of the respective ports.

2. The intermediate network device of claim 1 wherein one of the computed spanning tree instances corresponds to a Common Spanning Tree (CST) and the other computed spanning tree instances are each associated with different VLANs.

3. The intermediate network device of claim 2 wherein each VLAN is associated with a single spanning tree instance.

4. The intermediate network device of claim 3 wherein a GVRP declaration received on a first port and requesting registration of a specified VLAN is distributed to the MST-GVRP application at one or more other ports provided that the MST-GVRP application at the first port participates in the GIP context corresponding to the spanning tree instance to which the specified VLAN is associated.

5. The intermediate network device of claim 4 wherein the GVRP declaration is not propagated to the MST-GVRP application at any other port where the MST-GVRP application at the first port does not participate in the GIP context corresponding to the spanning tree instance to which the specified VLAN is associated.

6. The intermediate network device of claim 1 wherein a plurality of VLANs are associated with at least one spanning tree instance.

7. The intermediate network device of claim 6 wherein the MST-GVRP application of a given port participates in each GIP context that corresponds to a spanning tree instance for which the given port is in the forwarding state.

8. The intermediate network device of claim 7 wherein the MST-GVRP application of the given port does not participate in those GIP contexts that correspond to spanning tree instances for which the given port is in the blocking state.

9. The intermediate network device of claim 8 wherein a GVRP declaration received on a first port and requesting registration of a specified VLAN is distributed to the MST-GVRP application at one or more other ports provided that the MST-GVRP application at the first port participates in the GIP context corresponding to the spanning tree instance to which the specified VLAN is associated.

10. The intermediate network device of claim 6 wherein the MST-GVRP application of a given port does not participate in those GIP contexts that correspond to spanning tree instances for which the given port is in the blocking state.

11. In an intermediate network device having a plurality of ports for forwarding messages in a computer network in which multiple spanning tree instances are computed, a method for disseminating Virtual Local Area Network (VLAN) membership information across the computer network, the method comprising the steps of:
   for each spanning tree instance, transitioning the ports among a plurality of spanning tree states, including a forwarding state and a blocking state;
   establishing a Generic Attribute Registration Protocol (GARP) participant at each port, each GARP participant having a multiple spanning tree (MST) GARP VLAN Registration Protocol (MST-GVRP) application and a GARP Information Declaration (GID) component; and
   establishing a plurality of GARP Information Propagation (GIP) contexts providing communication between the MST-GVRP applications, each GIP context associated with a selected one of the multiple spanning tree instances.

12. The method of claim 11 wherein
   each VLAN is associated with no more than one spanning tree instance, and
   a plurality of VLANs are associated with at least one spanning tree instance.

13. The method of claim 12 wherein the MST-GVRP applications established at the ports of the intermediate network device participate in each of the GIP contexts that are associated with the spanning tree instances for which the respective port is in the forwarding state.

14. The method of claim 13 wherein the MST-GVRP applications do not participate in the GIP contexts that are associated with spanning tree instances for which the respective port is in the blocking state.

15. The method of claim 11 wherein one spanning tree instance corresponds to a Common Spanning Tree (CST) and the other spanning tree instances are each associated with different VLANs.

16. The method of claim 11 further comprising the steps of:
   receiving, on a given port of the intermediate network device, a GVRP declaration requesting registration of a specified VLAN;
   registering the specified VLAN at the given port;
   distributing the GVRP declaration to one or more MST-GVRP applications at other ports provided that the given port is in the forwarding state for the spanning tree instance associated with the specified VLAN.

17. The method of claim 16 further comprising the step of distributing the GVRP declaration to no other MST-GVRP applications where the given port is in the blocking state for the spanning tree instance associated with the specified VLAN.

18. The method of claim 16 wherein the GVRP declaration is distributed via one or more selected GIP contexts.

19. The method of claim 11 wherein the MST-GVRP applications established at the ports of the intermediate network device participate in those GIP contexts that are associated with the spanning tree instances for which the respective port is in the forwarding state.

20. The method of claim 19 wherein the MST-GVRP applications do not participate in those GIP contexts that are associated with the spanning tree instances for which the respective port is in the blocking state.

21. A computer readable medium containing computer executable program instructions for use by an intermediate network device having a plurality of ports for forwarding messages in a computer network in which multiple spanning tree instances are computed, the computer executable program instructions for recording Virtual Local Area Network (VLAN) membership information at the intermediate network device and comprising program instructions to cause the intermediate network device to:

for each spanning tree instance, transition the ports among a plurality of spanning tree states, including a forwarding state and a blocking state;

establish a Generic Attribute Registration Protocol (GARP) participant at each port, each GARP participant having a multiple spanning tree (MST) GARP VLAN Registration Protocol (MST-GVRP) application and a GARP Information Declaration (GID) component; and establish a plurality of GARP Information Propagation (GIP) contexts providing communication between the MST-GVRP applications, each GIP context associated with a selected one of the multiple spanning tree instances, wherein a plurality of VLANs are associated with at least one spanning tree instance.

22. The computer executable program instructions of the computer readable medium of claim 21 comprising further program instructions to cause the intermediate network device to place each MST-GVRP application in communicating relationship with each of the GIP contexts that are associated with spanning tree instances for which the respective port is in the forwarding state.

23. The computer executable program instructions of the computer readable medium of claim 22 wherein the MST-GVRP applications do not communicate via the GIP contexts that are associated with spanning tree instances for which the respective port is in the blocking state.

24. An apparatus comprising:

means for transitioning a port among a plurality of spanning tree states, including a forwarding state and a blocking state, for each of a plurality of spanning tree instances;

means for establishing a Generic Attribute Registration Protocol (GARP) participant at the port, the GARP participant having a multiple spanning tree (MST) GARP VLAN Registration Protocol (MST-GVRP) application;

means for associating each of a plurality of GARP Information Propagation (GIP) contexts with a selected one of the spanning tree instances; and means for arranging the MST-GVRP application to participate in one or more GIP contexts in response to the spanning tree state of the port in each spanning tree instance.

25. The apparatus of claim 24 wherein the means for arranging is configured to have the MST-GRVP application participate in any GIP context associated with a spanning tree instance in which the port is in the forwarding state.

26. The apparatus of claim 24 further comprising:

means for associating each of a plurality of VLANs with one of the spanning tree instances.

27. The apparatus of claim 26 further comprising:

means for receiving on the port a GVRP declaration requesting registration of a specified VLAN;

means for registering the specified VLAN at the port; and means for distributing the GVRP declaration to one or more MST-GVRP applications at other ports provided that the port is in the forwarding state for the spanning tree instance associated with the specified VLAN.

28. An apparatus comprising:

a spanning tree engine configured to transition a port among a plurality of spanning tree states, including a forwarding state and a blocking state, for each of a plurality of spanning tree instances;

a Generic Attribute Registration Protocol (GARP) participant at the port, the GARP participant having a multiple spanning tree (MST) GARP VLAN Registration Protocol (MST-GVRP) application;

a plurality of GARP Information Propagation (GIP) contexts, each GIP context associated with a selected one of the spanning tree instances, wherein the MST-GVRP application is further configured to participate in one or more GIP contexts in response to the spanning tree state of the port in each spanning tree instance.

29. The apparatus of claim 28 wherein the MST-GVRP application is further configured to participate in any GIP context associated with a spanning tree instance in which the port is in the forwarding state.

\* \* \* \* \*